April 5, 1966  E. A. BROWN  3,244,172
SYRINGE AND METHOD OF INJECTION
Filed Nov. 8, 1961
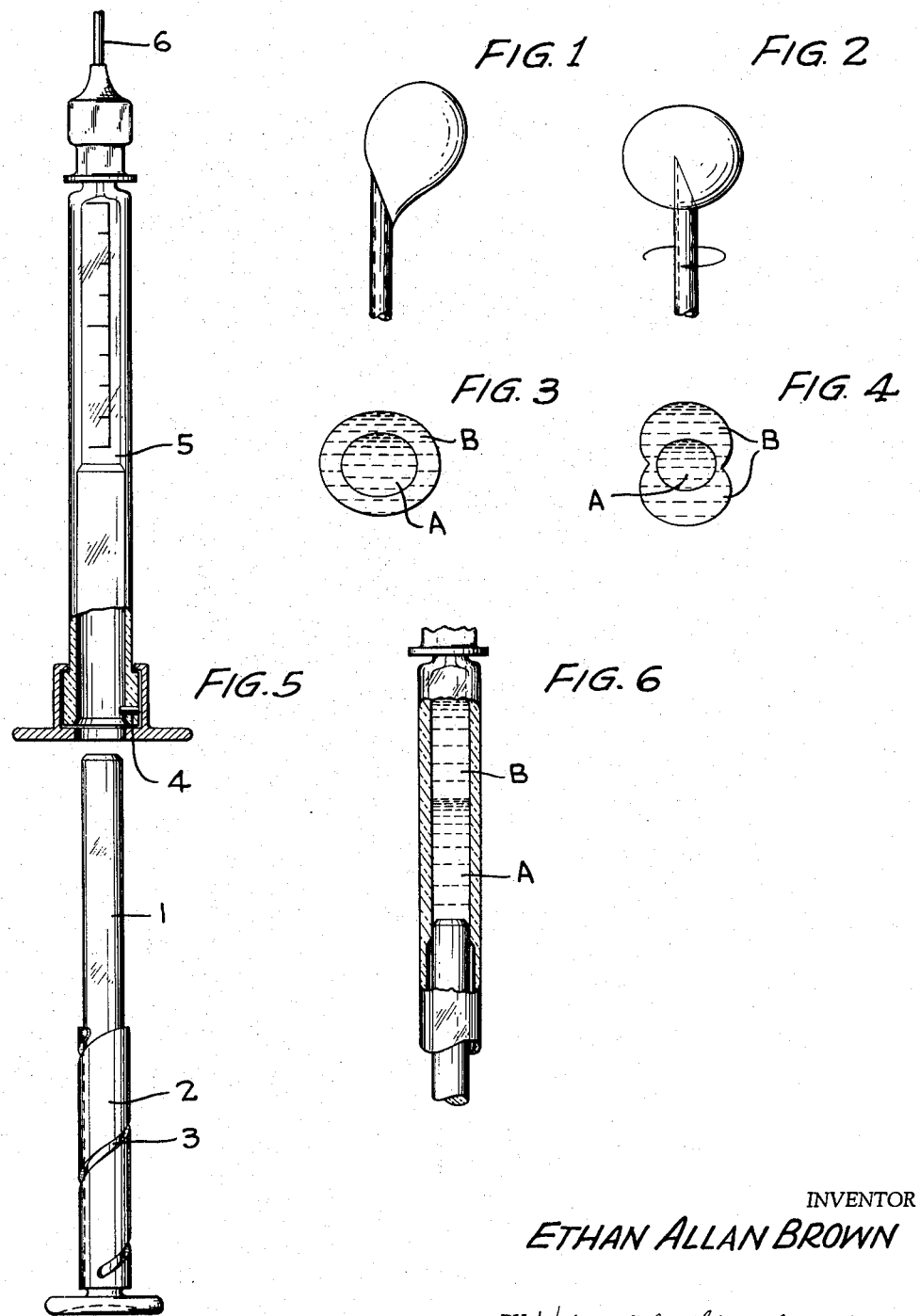
INVENTOR
ETHAN ALLAN BROWN
ATTORNEYS

United States Patent Office

3,244,172
Patented Apr. 5, 1966

1

3,244,172
SYRINGE AND METHOD OF INJECTION
Ethan Allan Brown, 75 Bay State Road, Boston, Mass.
Filed Nov. 8, 1961, Ser. No. 150,942
6 Claims. (Cl. 128—218)

This invention relates to a novel method and means of injecting active substances such as serums and vaccine. More particularly, the invention comprises a method of injecting a potent substance into the intra-cutaneous or intra-muscular tissues of a human being so that the substance is only slowly released, thereby lessening undesirable side effects. The novel method permits the injection of a potent substance completely surrounded by an inactive or a second less active substance.

In prior art methods of injection, the usual procedure is to insert the needle of the syringe into the intra-cutaneous or intra-muscular tissues of the patient by a sharp jab or pushing action. Pressure is exerted on the plunger of the syringe to inject the contents. At times, a turning or twisting action may be employed to cause the needle to enter the tissues more easily or to more easily effect its removal. However, while the substance in the syringe is being injected, the syringe is held substantially still. The injection of any substance by this method enters the intra-cutaneous or intra-muscular tissues similar to a balloon being inflated into a sphere. At the termination of the injection, the sphere of injected material is on the outside edge of the needle as illustrated in FIGURE 1 of the drawing.

It has now been found that if the needle is inserted into the intra-cutaneous or intra-muscular tissues and the syringe revolved 360° on its longitudinal axis, a sphere of the same cubic volume for a given amount of substance is obtained, but the eye of the needle opening is in the center of the sphere rather than on one side. This phenomenon is illustrated in FIGURE 2 of the drawing. Thus, a second injection of substance can be made in the center of the first sphere providing concentric spheres as illustrated in FIGURE 3 of the drawing. It is apparent that the second injection can be made while the needle is held stationary or the needle can again be rotated 360°.

A modified procedure is to inject one half of the first material while revolving the needle 360°, and then pull the needle back, or push it forward from about 2 to 5 mm. and inject the other half of the first substances. Since the substances are identical, a double sphere will be formed with no separation or demarcation between the two spheres. The needle is again pulled back or pushed forward from about 2 to 5 mm. and the second substance injected while revolving the needle 360°. A bubble as illustrated in FIGURE 4 will be formed.

In order to obtain concentric circles, it is preferred that the substance of the initial injection be of greater viscosity than the substance of the second injection. However, materials of substantailly the same viscosity can be employed as long as the materials are substantially immiscible in one another. The method can also be employed when the second material to be injected is of greater viscosity than the first substance, again the materials being substantially immiscible.

The instant method of injection has particular application where it is desirable to protect a patient against undesirable side effects caused by the active substance. Thus,

2 it is an object of the instant invention to provide a method of injecting an active substance so that it is only slowly diffused.

It is another object of the instant invention to provide a method of injecting an active substance in the center of, or completely surrounded by an inactive substance.

It is another object of this invention to provide a packaged injection containing an active and inactive substance for injection, whereby the active substance is only slowly released.

It is another object of this invention to provide a novel syringe which will permit the depositing of an active substance in the center of an inactive substance employing normal injection techniques.

These and other objects of the invention will become more apparent from the following detailed description with particular emphasis being placed on the drawing wherein FIG. 1 is a diagram showing the formation of a bubble of liquid as it is injected in the conventional manner.

FIG. 2 is a diagram showing the formation of a sphere of liquid as it is injected in accordance with the present invention.

FIG. 3 shows the concentric spheres of injected substances formed upon injection in accordance with the present invention.

FIG. 4 shows spheres of injected substances formed in accordance with a specific embodiment of the present invention.

FIG. 5 is a diagram in elevation of the syringe of the present invention showing the detached plunger and barrel.

FIG. 6 is a diagram of elevation of a portion of the syringe of the present invention along the line 1–5 of FIG. 5 illustrating the plunger and barrel depressively engaged and containing injectible substances.

According to the instant invention, if a particular vaccine or serum has a toxic or adverse effect upon a patient, a syringe is partially loaded with an active substance and thereafter with a protective or neutralizing substance, i.e., the first material in the syringe, the active material, is the last material out. The injection of the inactive material can be made as described above, rotating the needle of the syringe 360° while exerting pressure on the plunger. Thereafter, the active material can be injected while again rotating the needle of the syringe 360° or while holding the needle stationary. The term "inactive" as it is used in the instant specification is relative to the active or potent substance.

In order to determine where the active substance begins in the syringe, it can be desirable to have the active and inactive materials of different colors. Therefore, when making an injection, the injector can easily determine when all of the inactive material has been deposited and when the active material is being injected. Thus, the instant invention provides packaged injections of substances which are immiscible in one another, whereby the injector can conveniently see what portion is being injected. The injector can load the syringe as described so that the colored material which has been placed into the syringe last, the inactive material, is injected as a spherical bubble, and thereafter, the second half or active material is injected. Such "packaged injections" as for example, an injection for treating hay fever, are convenient for the injector and eliminate, to a substantial extent, possibility of error. The dissimilar substances are separated in the package by a plastic or self-sealing rubber membrane, or they can be maintained apart due to a difference in miscibility characteristics.

The different substances to be injected, as stated hereinbefore, should be substantially immiscible in each other in order to obtain a clear division of active and inactive material. Thus, if the two materials to be injected are completely miscible, the second material will immediately flow into the first injected material and merely cause a dilution of the active ingredient. However, where only a slight delay in the diffusion of the active material in the patient's system is desired, the two injectionable substances can be substantially miscible. Therefore, in selecting the protective blanket layer to enclose the active material, judicious care is necessary. The protective layer can be a relatively viscous emulsion or thickened solution. For most applications where an inactive protective coating is desired, a saline solution is satisfactory. However, at times, it may be desirable to innoculate an individual with two different active ingredients. For example, in a patient afflicted with hay fever, the first injected material can consist of an antihistaminic agent in an emulsified form, and the second injection consists of an emulsified or thickened pollen extract. As another application, the first injected material can consist of an emulsified constituted lyophilized serum for tetanus and the second proportion to be injected, the tetanus toxoid. As is apparent, the applications of the instant invention are many, it also being possible to inject two "safe" active materials, one material being for immediate action and the second for delayed effect. Thus, a poliomyelitis vaccine and influenza virus vaccine in thickened or emulsified form can be injected in a single injection. As stated hereinbefore, the last substance loaded in the syringe is the first out and will completely surround the second substance keeping it substantially out of contact with the tissues of the patient. The outside blanket is slowly adsorbed and the substance in the internal sphere will not reach the tissue cells all at once.

One preferred embodiment of the instant invention is the treatment of a patient to combat the effects of hay fever. Thus, 0.4 ml. of emulsified pollen extract is loaded in a hypodermic syringe and thereafter 0.6 ml. of an antihistaminic agent. The pollen extract is colored red and the antihistaminic agent is milky in color showing a clear line of separation in the hypodermic syringe. The 0.6 ml. of antihistaminic agent is injected while rotating the needle of the syringe 360°, thereafter, the 0.4 ml. of emulsified pollen extract is injected while again rotating the needle of the syringe 360°. Thus, the active pollen extract is completely blanketed by the protective antihistaminic drug. The material in the internal sphere, the active pollen extract, will only slowly reach the tissue cells of the subject. When the active material does reach the tissue cells, the protective antihistaminic agent in the external sphere will also exert its effect, insuring the safety of the injection of the active material. In addition to injection of the antihistaminic agent, it is possible to inject bronchodilating drugs or an antibiotic substance. The applications of the instant method of injection are many.

The novel method of injection can be accomplished employing syringes commonly used in the art. However, with such syringes, it is necessary that the injector carefully revolve the syringe while exerting pressure on the plunger to insure that a complete 360 revolution of the needle is made while injecting the inactive substance. Thus, it is preferred to employ a syringe having means for revolving the needle of the syringe automatically as the plunger is pressed home. Such a syringe permits greater speed in injecting as well as more controlled results.

In the drawing, FIGURE 5 illustrates a syringe having a barrel and needle which is rotated by means of a pin and groove mechanism. FIGURE 6 illustrates the syringe of FIGURE 5 showing the plunger depressed to a position where further depression will dispense the injectionable material and cause the needle to revolve.

More specifically, referring to FIGURE 5, the syringe comprises a plunger 1, a sleeve 2 on said plunger containing a groove 3 which makes two complete 360° revolutions. When the grooves engage the pin 4 and the plunger is depressed, the internal barrel 5 of the syringe containing the injectionable substance and the needle 6 revolve. Thus, employing a syringe of the present type, the instant novel method of injection can be performed using the ordinary injection techniques, i.e., the needle of the syringe is jabbed or pushed into the intra-cutaneous or intra-muscular tissue of the subject and the subject and the plunger pressed home in a convenient one-handed operation. As the plunger is being depressed, the needle automatically rotates. Depending upon the set of the grooves in the sleeve, the first revolution will be completed while one fourth, one half, three quarters etc. of the substance in the barrel of the syringe is injected. The remaining substance will be injected during the second revolution, or while the needle is stationary. In the embodiment shown in the drawing, one half of the substance is injected during each 360° revolution of the barrel and needle. However, as in apparent, any ratio can be injected per revolution by suitable modification of the sleeve of the syringe. It is not completely necessary to have a separate syringe for each ratio of active and inactive material, but it is only necessary to employ different plungers. While the drawings illustrate only one method of revolving the syringe, other suitable means can be employed.

It should be appreciated that the invention is not to be construed to be limited by the illustrative embodiments or drawing. It is possible to devise still other embodiments without departing from the inventive concept herein disclosed.

What is claimed is:

1. The method of injecting the contents of a hypodermic springe containing a first injectionable substance and a second injectionable substance, the second injectionable substance being substantially immiscible with the first injectionable substance, comprising (1) inserting the needle of the syringe into the subject, (2) injecting the first injectionable substance into the subject while revolving the needle 360° on its longitudinal axis, (3) injecting the second injectionable substance without removing the needle, whereby the second injectionable substance is contained in the first injectionable substance, and (4) withdrawing the needle.

2. The method of claim 1 wherein the needle of the springe is rotated 360° while injecting one half of the first injectionable substance, withdrawing the needle from about two to five mm. and rotating the needle 360° while injecting the second half of said first injectionable substance.

3. The method of injecting a subject with the contents of a hypodermic syringe containing an active material and an inactive material comprising the steps of (1) inserting the needle of the syringe into the subject, (2) injecting the inactive substance into the subject while revolving the needle 360° on its longitudinal axis, (3) injecting the active substance into the subject while revolving the needle 360° on its longitudinal axis, whereby the active material is completely enclosed in said inactive material and (4) withdrawing the needle.

4. The method of claim 3 wherein the inactive substance of step (2) and the active substance of step (3) are of different colors and substantially immiscible in one another and contained in a pre-packaged package, said package having a self-sealing partition separating said active and inactive substance.

5. A syringe for the injection of a potent substance comprising a barrel, open at one end, a needle in communication with the interior of said barrel, a plunger extending through said opening in said barrel and depressively engaged within said barrel and cooperating means provided on said barrel and plunger for rotating said barrel and said needle at least 360° on its longitudinal axis coincidental with depression of said plunger in said barrel to inject said substance.

6. The syringe of claim 5 wherein said means comprises said plunger having a helically grooved sleeve and said barrel having a pin for engagement with said sleeve, whereby the needle and barrel are rotated at least one 360° revolution when the plunger is being depressed.

References Cited by the Examiner
UNITED STATES PATENTS

| | | | |
|---|---|---|---|
| 793,099 | 6/1905 | Sapp | 128—218 |
| 1,234,582 | 7/1917 | Trueblood | 128—218 |
| 1,279,069 | 9/1918 | Yoshids | 128—218 |
| 2,530,480 | 11/1950 | Pitkin | 167—82 |
| 2,636,644 | 4/1953 | Taylor | 128—272 |
| 2,705,956 | 4/1955 | McLaughlin | 128—272 |
| 2,856,885 | 10/1958 | Huyck et al. | 128—272 |
| 2,895,475 | 7/1959 | Cole | 128—272 |
| 2,939,459 | 6/1960 | Lazarte et al. | 128—218 |
| 3,096,249 | 7/1963 | Prigal | 167—78 |

OTHER REFERENCES

Berlin: article in the Journal of Immunology, vol. 85, July 1960, pages 81–89.

RICHARD A. GAUDET, *Primary Examiner.*

R. J. HOFFMAN, JORDAN FRANKLIN, *Examiners.*